UNITED STATES PATENT OFFICE.

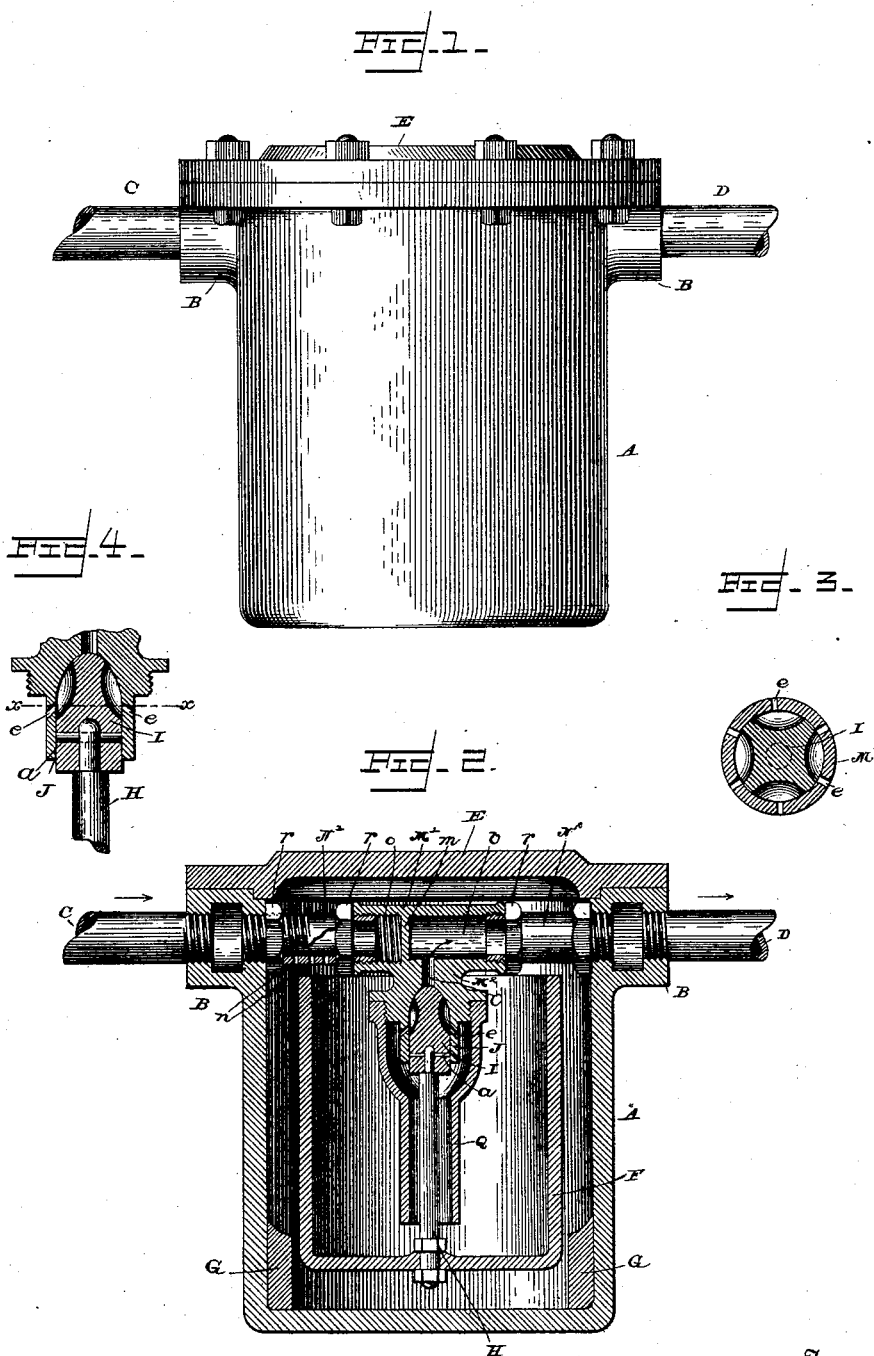

JOHN McKELLAR, OF SAN FRANCISCO, CALIFORNIA.

STEAM-TRAP.

SPECIFICATION forming part of Letters Patent No. 481,507, dated August 23, 1892.

Application filed April 14, 1892. Serial No. 429,174. (No model.)

*To all whom it may concern:*

Be it known that I, JOHN MCKELLAR, a citizen of the United States, residing in the city and county of San Francisco, State of California, have invented certain new and useful Improvements in Steam-Traps, such as are employed for collecting and discharging condensed water from steam, as set forth in the following specification and drawings, which I hereby declare to be a full, clear, and exact description of my invention.

My invention consists in providing for such traps a main vessel or case having a detachable cover, easily removed and to which none of the operating parts are in any way connected, and in forming at the top of this containing vessel or case two opposite bosses and apertures, in which the outlet and inlet pipes are secured, also a cross-pipe inside the vessel, composed of sections, to which all the operating parts are attached.

It further consists in a peculiar form of the outlet-valve, apertures to admit the water thereto, and other details, as shown in the drawings, in which—

Figure 1 is a side elevation of one of my improved traps as it appears when completed and ready to be connected for use. Fig. 2 is a vertical central section through Fig. 1, showing the construction and arrangement of the interior parts. Fig. 3 is a transverse section on the line $xx$ of Fig. 4. Fig. 4 is an enlarged vertical section through the valve and its seat.

Similar letters of reference on the different figures indicate corresponding parts thereof.

Referring to the drawings, the main containing-vessel A is made strong enough to withstand the pressure of the steam and has at its top two bosses B B, into which are screwed the inlet-pipe C and the outlet-pipe D. The top of this main vessel A is flanged to receive a covering-plate E, which, as shown, has no connection with the interior or operating parts of the trap and can be readily removed for inspection, adjustment, or repairing of the interior parts. Within this main vessel A is an open-top float-vessel F, that opens and closes the main escape-valve by its weight or buoyancy as the outer vessel A is filled and discharged. This float-vessel F is guided or retained in an approximately vertical position by the ledges G, cast on the outer or main vessel A, as shown in Fig. 2, and is also guided and held in position by the valve mechanism, as hereinafter explained. To the bottom of this float-vessel F is attached a stem H, on the top of which is loosely fitted the ball-pointed valve I, a cross-pin $a$ keeping the two together, as shown in Fig. 4, the fit in the socket J being loose enough to permit the valve to settle fairly on its seat irrespective of some deviation in the movement of the float-vessel F.

Across the top of the chamber A and screwed into the inner ends of the bosses B B are sections of pipe or nipples $N'$ $N^2$, also screwed into the central hollow member $M'$, and provided with jam-nuts $r$ at each end, so that these nipples $N'$ and $N^2$ can be screwed into the sides outward, and thus release the central member $M'$, so that it can be conveniently removed or replaced. Projecting downward from this central member or chamber $M'$ is a nipple $M^2$, to which are attached all the operating parts of the trap. In this nipple $M^2$ is formed the seat for the spherical-pointed valve I, and at the sides, below the valve-seat, are diagonal inlet-holes $e$ $e$, leading forward in the direction of the flow, so as to cause an induced current through the valveway, and thus avoid the noise common in such escape-valves. Opposite these holes and below the ball-pointed valve I the anterior portion of the valve or its stem is of cruciform section, as shown in Fig. 3, so that water entering through the apertures $e$ $e$ may find its way without obstruction around the end of the valve I and through the outlet O into the discharge-pipe D. The short pipe or nipple $N'$ is provided with holes $n$ on its bottom side, so that water entering through the inlet-pipe C falls down through these holes $n$ into the float-vessel F.

The central hollow member $M'$ has a diaphragm $m$, which divides the steam-inlet pressure in the chamber $o$ from the exhaust or escape pressure in the chamber $v$, also cuts off connection between the inlet-pipe C and the outlet-pipe D.

Surrounding the valve I and stem H is a tube or vessel Q, that prevents any water from reaching the valve I except from the bottom or near the bottom of the float-vessel F. This ube is of a bulb form at the top, so as to surround the nipple M² and the valve-seat, to which it is screwed fast, but leaving a full space all around, so the water can reach without obstruction the apertures e e in the sides of the nipple M².

The operation of the trap is as follows: The main vessel A being filled with water, the float F by its buoyancy holds the valve I shut; but when water entering by the pipe C falls down through the holes n and fills the float-vessel F the latter sinks, opening the valve I, permitting the water to escape down to such a point in the main vessel F as will permit its buoyancy to raise it again, and thus shut off the escape of water through the valve I and the pipes N² and D, it being understood that the main vessel A remains at all times filled with water up to the point of overflowing into the float-vessel F.

Having thus described the nature and objects of my invention, what I claim as new, and desire to secure by Letters Patent, is—

1. In a steam-trap, the combination of the main vessel A, the open-top float-vessel F, located within the main vessel, the valve-stem H, attached at its lower end to the bottom of the float-vessel, a ball-pointed valve I, carried loosely upon the upper end of the valve-stem, an inlet-pipe C and outlet-pipe D, both connected to the wall of the main vessel, a central member M' between the outlet and inlet pipes, said central member being provided with a diaphragm m and a nipple M², in which is formed a seat for the spherical-pointed valve I, while at the sides below the valve-seats are diagonal inlet-holes e e, and the tube or vessel Q, attached to the nipple M² and surrounding the valve-stem H, substantially as described.

2. In a steam-trap, the combination of the main vessel A, provided with the detachable covering-plate E and lateral bosses B B, the sections of pipe or nipples N' N², screwed into the inner ends of said bosses, a float-vessel F within the main vessel, carrying the valve-stem H, having at its upper end the ball-pointed valve I, a central hollow member M', into which the nipples N' N² are screwed, said member M' being provided with jam-nuts r at each end and also with a diaphragm m and a downwardly-extending nipple M², in which is formed a seat for the pointed valve I, while at the sides below the valve-seat are diagonal inlet-holes e e, an inlet-pipe C, entering one of the bosses B, the adjacent pipe N' being provided with holes n on its bottom side, an outlet-pipe D, screwed into the other boss B, and the tube or vessel Q, attached to the nipple M² and surrounding the valve-stem H, so as to prevent any water from reaching the valve except from the bottom of the vessel F, substantially as described.

In testimony whereof I have hereunto affixed my signature in the presence of two witnesses.

JOHN McKELLAR.

Witnesses:
ALFRED A. ENQUIST,
WILSON D. BENT, Jr.